United States Patent [19]
Durnin

[11] Patent Number: 5,500,266
[45] Date of Patent: Mar. 19, 1996

[54] SPIN-COATING COMPENSATION FOR AN OPTICAL STORAGE MEDIUM WITH A SUBSTRATE GROOVE PROFILE GRADIENT

[75] Inventor: James E. Durnin, Fairport, N.Y.

[73] Assignee: Eastman Kodak Company, Rochester, N.Y.

[21] Appl. No.: 209,149

[22] Filed: Mar. 10, 1994

[51] Int. Cl.⁶ .................................................. B32B 3/00
[52] U.S. Cl. ...................... 428/64.1; 428/64.2; 428/64.4; 428/64.8; 430/945; 430/270.1; 369/277; 369/283; 369/279
[58] Field of Search ............................. 428/64, 65, 913, 428/64.1, 64.2, 64.4, 64.8; 430/270, 945; 346/76 L, 135.1; 369/277, 283, 279

[56] References Cited

U.S. PATENT DOCUMENTS

| | | | |
|---|---|---|---|
| 5,080,946 | 1/1992 | Takagisi | 428/64 |
| 5,213,859 | 5/1993 | Aoi | 428/64 |
| 5,316,814 | 5/1994 | Sawada | 428/64 |
| 5,344,682 | 9/1994 | Mizukuki | 428/64 |

Primary Examiner—Patrick J. Ryan
Assistant Examiner—Elizabeth Evans
Attorney, Agent, or Firm—John R. Everett

[57] ABSTRACT

When a dye material layer is spin-coated on an optical storage medium of the type having grooves fabricated in a substrate thereof, the dye material layer surface has depressions in the vicinity of the grooves. These depressions have a profile which is a function of the distance from the center of the storage medium. To compensate for the radial dependence of the depressions, the geometry of the grooves is changed by varying the base dimension of the groove as a function of the distance from the center of the storage medium. In this manner, the difference in phase for radiation traversing the storage medium by an optical path that includes a groove as compared to an optical path that does not include an associated groove is constant as a function of distance from the center of the storage medium. The phase difference which is a constant as a function of distance from the center of the storage medium is important in the generation of signals used in tracking the groove.

10 Claims, 2 Drawing Sheets

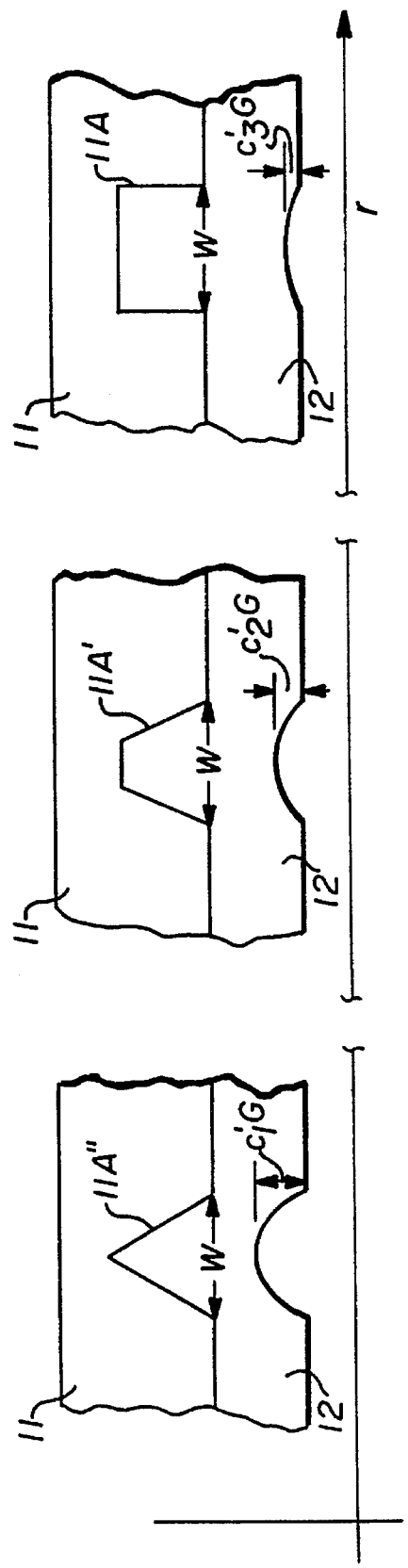

SPIN-COATING COMPENSATION FOR AN OPTICAL STORAGE MEDIUM WITH A SUBSTRATE GROOVE PROFILE GRADIENT

FIELD OF THE INVENTION

This invention relates generally to information storage media which has information stored thereon in an optically readable format and, more particularly, to storage media having a substrate with grooves fabricated thereon prior to having a dye material layer applied to the substrate by a spin-coating process.

BACKGROUND OF THE INVENTION

In one of the classes of optical information storage medium, a substrate is fabricated which has grooves formed in at least one surface of the substrate. Using a spin-coating technique, a dye material layer is applied to the surface of the storage media into which the grooves have been fabricated. The grooves can be used to define the track upon which information in the dye layer can be stored and accessed. The grooves are identified by a difference in phase for radiation traversing an optical path in the storage medium that includes a groove as compared to the phase of radiation traversing a path near to, but not including, the groove. This detection of this difference in phase for radiation transmitted by the storage medium, either using density tracking or phase tracking techniques, results in control signals which activate the servo tracking mechanisms. Through interaction with radiation applied to the storage medium, the optical properties of the dye material layer can be altered along the track defined by the groove(s). In this manner, information can be stored on the storage medium and, because of the alteration of the optical properties, the information can be retrieved through interaction of the storage medium with a suitable radiation beam and radiation detection apparatus.

Referring to FIG. 1, the cross-sectional structure of an optical information storage media suitable for advantageously using the present invention is shown. A substrate 11, typically comprised of a polycarbonate material, has a groove 11A fabricated therein, the groove having a depth of G and a width W. A dye material layer 12 of thickness L is deposited on the substrate 11, typically by a spin coating procedure. A reflecting coating 13 is then deposited on the dye layer. In the immediate vicinity of the groove 11A, the application of the dye material layer does not result in a flat surface, but has a depression of height cG, where c is referred to as the conformality, caused by the presence of the groove.

The difference in phase of a light beam reflected from a land (non-groove) area and a light beam reflected from groove area, when not a constant over the storage region of the storage medium, can result in a degradation of the ability of the detection system to differentiate between the two types of regions. As result degradation, the groove tracking can become inoperative. In European Patent Application Number 92109463.7, filed in the name of T. Mizukuki, T. Koike, N. Kitagawa, and S. Hirose, an attempt has been made to solve the problem of the radial dependence of the difference in phase as a function of radius by varying the depth G and/or the width W of the grooves as a function of radius. While this attempt to eliminate the radial dependence of the difference in phase has resulted in improvement of the tracking characteristics of the detection system, the difficulty in distinguishing between an optical path that passes through a land region from an optical path that passes through a groove has continued to limit the performance of an optical storage system. In addition, it has been determined that unless the variation in the depth of the groove(s) are small, changes in the amplitude of the (read-out) signals during the accessing of the information written in the dye material layer can degrade the performance of the information storage system.

A need has therefore been felt for an optical storage medium which provides a difference in the phase of a radiation beam transmitted through a groove and a radiation beam transmitted through a land area which is approximately constant as function of distance from the center of the storage medium. In addition, a need has been felt for a groove structure that can provide a the constant difference in phase over the information bearing portion of the storage medium without compromising the performance of the read-out of information stored in the dye material layer.

SUMMARY OF THE INVENTION

The present invention is directed to overcoming one or more of the problems set forth above. Briefly summarized, according to one aspect of the present invention, the radial dependence of the conformality of the dye material layer in the vicinity of a groove resulting from the spin-coating process of the dye is compensated by varying the shape of groove as a function of distance from the center of the optical information storage media. In particular, the depth of the groove is maintained at a generally constant value and the width of the groove opening is similarly maintained at a generally constant value. However, the width of the base of the groove is varied from approximately zero at the inner portion of the information bearing region to approximately the width of the groove opening at the outer portion of the information bearing region. In this manner, the difference in phase for a radiation beam passing through a groove region as compared to a radiation beam passing through a neighboring land region is approximately independent of distance from the center of the storage medium.

By adjusting the width of the base of the groove, the difference in phase between an optical path through a groove region and an optical path through a neighboring land region is approximately independent of the distance from the center of the storage medium. In this manner, the tracking of the groove(s) over the information bearing region of the storage medium will not vary and can be adjusted for maximum detectability. In addition, the dependence with distance from the center of the storage medium of parameters controlling read-out from information stored in the dye material layer is minimized.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 illustrates the change in the groove geometry with radius which reduces the radial dependence of the difference in phase, $\Delta_{OP}$, of the surface irregularities formed the surface of a media as a result of spin-coating a dye material layer over a grooved surface according to the present invention.

DETAILED DESCRIPTION OF THE INVENTION

When the index of refraction for the substrate of an optical storage medium is given by $N_S$ and the index of refraction of the dye material layer is given by $N_D$, then the difference in phase, $\Delta_{OP}$, of a beam of light of wavelength $\lambda$ passing through the substrate 11 and dye layer 12 in a land region path (i.e., a region without a groove) and a beam of light passing through the substrate 11 and dye layer 12 and includes passage through a groove 11A is given by:

$$\Delta_{OP}=(4\pi/\lambda)\{(N_D.S)-(N_S.G+N_D.L)\}$$

where the factor of $4\lambda$ arises from the double passage through the storage medium as a result of reflection from the reflecting layer.

Figure 1:
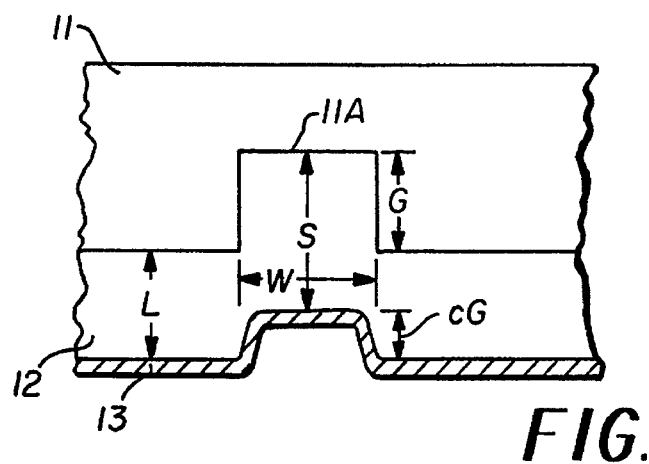
FIG. 1 is a cross-sectional view of a groove on a disk having a dye material layer spin-coated thereon.
Figure 2:
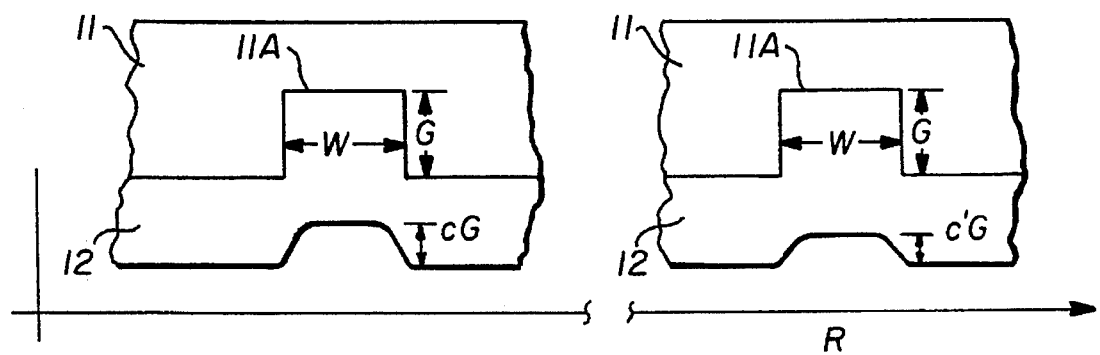
FIG. 2 illustrates the change with radius of the conformality of the surface of a dye-coated layer spin-coated on a grooved substrate.

Referring to FIG. 1;

$$S=[1-c].G+L$$

$$\Delta_{OP}=(4\pi/\lambda)\{N_D.[1-c]G-N_SG\}$$

$$\Delta_{OP}=(4\pi/\lambda)\{N_D.[1-c]-N_SG\}$$

However, it has been observed that the difference in phase $\Delta_{OP}$ is a function of the distance from the center of the storage medium r, or $\Delta_{Op}(r)$. This difference in phase is a function of radius because the conformality c is a function of radius, $c(r)$ (as a result of the spin-coating procedure). In the present invention, the shape of the groove is varied, rather than the depth. The depth G is therefore replaced by a shape or form factor $<Q(r)>$ for the groove cross-section, the average value being a function of r. (The symbols $<>$ are used to denote that an average value is being represented.) Thus the equation for difference in phase, $\Delta_{OP}$, becomes $$\Delta_{OP}=(4\pi/\lambda)\{N_D.[1-c(r)]-N_S\}<Q(r)>$$

For optimum tracking, $$\Delta_{OP}=\text{constant}$$

Referring to FIG. 3, the technique, according to the present invention, for compensating for the difference in phase, $\Delta_{OP}$, between an optical path that includes a groove and an optical path that does not include a groove in the optical storage media is illustrated. The conformality c decreases for $c_1$ through $c_3$ as a function of distance from the center of the optical storage media. The cross-section of the groove varies from approximately a triangle 11A" through a trapezoid, 11A' to a rectangle 11A as a function of distance from the center of the optical storage media. By appropriate selection of parameters, the difference in phase, $\Delta_{OP}$, can be maintained at approximately a constant value.

In the preferred embodiment, the information bearing portion of the disk extends from a radius of 23 mm to a radius of 57 mm. The conformality varies from $c_1 \approx 0.60$ at the 23 mm dimension to $c_3 \approx 0.52$ at the 57 mm dimension. The width of the groove opening, which remains approximately constant over the area of the information bearing region, is $\approx 500$ nm. Similarly, the maximum depth dimension of the groove, which remains approximately constant over the information-bearing region of the disk, is $\approx 180$ nm. The base dimension of the groove at the furthest extend (i.e., 57 mm) of the information bearing region, is $\approx 500$ nm. This base dimension then decreases with decreasing distance from the center of the optical storage media. In this region, the groove is approximately triangular in cross-section, i.e., the base dimension is $\approx 0.0$ nm. By controlling the geometry of the grooves, it has been found that the difference in phase, $\Delta_{OP}$, can be maintained at a constant value over the radius of the information-bearing region of the optical storage medium thereby improving the performance of the optical information system using the storage medium. By maintaining a constant maximum depth while changing the shape of the cross-section of the groove with distance from the center of the storage medium, the radial dependence for read-out parameters has been found to be minimized.

It will be now appreciated that there has been presented a technique for maintaining the difference in phase, $\Delta_{OP}$, between an optical path including a groove and an optical path not including a groove, as constant as a function of distance from the center of the optical storage media.

Operation of the present invention is believed to be apparent from the foregoing description and drawings, but a few words will be added for emphasis. By definition, the depth of the depression, x, in the vicinity of a groove is given by the conformality times the shape or form factor of the groove $<Q(r)>$ of the groove, or $x=c(r).<Q(r)>$. In fact, the depression is an average depression or, $<x>$. Consequently, $<x>= c(r).<Q(r)>$. Because of the varying geometry of the grooves of the present invention, an optical beam will illuminate a region $<Q(r)>$, wherein said $<Q(r)>$ is an average depth of said groove in the vicinity of the depression. The present invention can be understood as a selection of the shape or form factor $<Q(r)>$ which results in a depression $<x>$ which establishes the conformality $c(r)$. Therefore, the form or shape factor $<Q(r)>$ is selected to satisfy the condition that the difference in phase, $\Delta_{OP}$, is a constant as a function of distance from the center of the storage medium.

The grooves are fabricated in the surface of the substrate of the optical storage medium through use of a master process. The structures of the groove(s) in the master and, consequently, in the optical storage medium are determined by appropriate irradiation of the photo-resist layer during the mastering process.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the spirit and scope of the invention.

Parts List 11 substrate
11A, 11A', 11A" groove in a substrate
12 dye material layer 13 reflecting coating

What is claimed is:

1. An optical storage medium comprising:

a substrate having at least one groove, said at least one groove being fabricated on a first surface of said substrate; and a dye material layer formed on said first surface, wherein said dye material layer is spin-coated on said first surface, said at least one groove having a base dimension which is a function of a distance from a center portion of said substrate.

2. The optical storage medium of claim 1 wherein said at least one groove results in depressions formed in a surface of said dye material layer, wherein said base dimension functionality of said at least one groove in combination with an associated depression in said dye material layer results in a difference in phase between an optical path including said at least one groove and an optical path not including said at least one groove which is independent of distance from a center portion of said substrate.

3. The optical storage medium of claim 2 wherein a maximum depth for said at least one groove is constant as a function of distance from a center of said storage medium.

4. The optical storage medium of claim 3 wherein said dye material layer is covered by a reflecting layer.

5. The optical storage medium of claim 3 wherein said groove constant maximum depth reduces a radial dependence of parameters for read-out of information stored in said dye layer.

6. The optical storage medium of claim 2 wherein said difference in phase is given by the equation $$\Delta_{OP}=(4\lambda/\pi)\{N_D.[1-<x>/<Q(r)>]-N_S\}Q(r)>$$

wherein:

$\Delta_{OP}$ is the difference in phase between a land region and a neighboring groove region;

$N_D$ is the index of refraction of the dye material layer;

$N_S$ is the index of refraction of the substrate;

$\lambda$ is the wavelength of the radiation beam traversing the optical storage medium;

$<x>$ is the average depth of the depression; and $<Q(r)>$ is the form factor defining the average depth of a groove in the vicinity of a depression.

7. The optical storage medium of claim 1 wherein:

(a) the depth and the width of said at least one groove are maintained at a generally constant value and (b) relative to the center portion of the substrate the base of the groove is varied from approximately zero at the inner portion of the information bearing region to approximately the width of the groove opening at the outer portion of the information bearing region.

8. A method of fabricating an optical storage medium, said method comprising the steps of:

in a substrate, fabricating grooves in a first surface of said substrate, said groove having a base dimension which is generally a function of the distance from a center portion of said substrate; and spin-coating a dye material layer on said first surface.

9. The method of claim 8 wherein said fabricating step includes the step of selecting said base dimension such that a phase difference through said optical medium between a land region and a groove region is approximately a constant.

10. The method of claim 8 wherein a surface of said dye material layer has depressions therein resulting from an associated groove region, said method further comprising the step of selecting said base dimension or a groove subject to the condition that $$\Delta_{OP}=(4\lambda/\pi)\{N_D.[1-<x>/<Q(r)>]-N_S\}Q<(r)>\approx \text{constant}$$

wherein:

$\Delta_{OP}$ is the difference in phase between a land region and a neighboring groove region;

$N_D$ is the index of refraction of the dye material layer;

$N_S$ is the index of refraction of the substrate;

$\lambda$ is the wavelength of the radiation beam traversing the optical storage medium;

$<x>$ is the average depth of the depression; and $<Q(r)>$ is the form factor defining the average depth of a groove in the vicinity of a depression.

* * * * *